United States Patent [19]

Adcock et al.

[11] 4,065,785
[45] Dec. 27, 1977

[54] SINGLE SENSOR TIME ENCODED COLOR IMAGING SYSTEM

[75] Inventors: Willis A. Adcock; Frank L. Skaggs, both of Dallas, Tex.

[73] Assignee: Texas Instruments Incorporated, Dallas, Tex.

[21] Appl. No.: 700,431

[22] Filed: June 28, 1976

[51] Int. Cl.² .......................... H04N 9/04; H04N 9/07
[52] U.S. Cl. .................................................... 358/44
[58] Field of Search .................... 358/44, 47, 48, 41

[56] References Cited

U.S. PATENT DOCUMENTS

| 3,982,274 | 9/1976 | Chai | 358/41 |
| 4,001,878 | 1/1977 | Weimer | 358/41 |

Primary Examiner—Robert L. Richardson
Attorney, Agent, or Firm—Rene' E. Grossman; Stephen S. Sadacca

[57] ABSTRACT

Light from an object to be imaged is optically filtered by a striped optical filter and encoded into a series of electrical pulses by a matrix image sensor. The electrical pulses from the image sensor are then time decoded by a decoder circuit to produce three color information signals.

31 Claims, 9 Drawing Figures

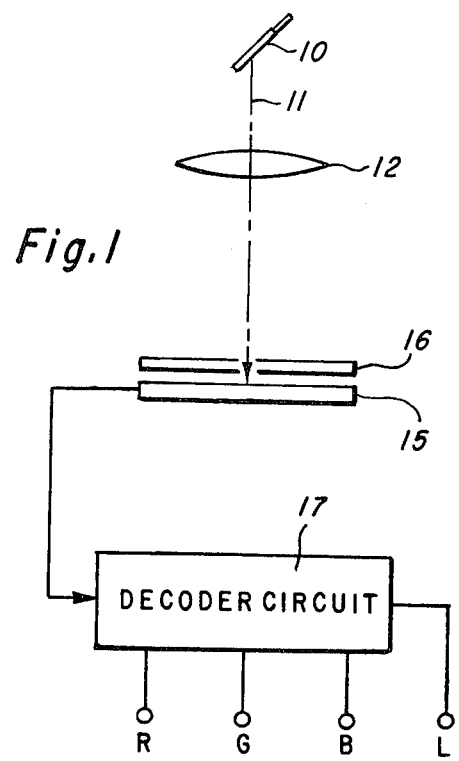
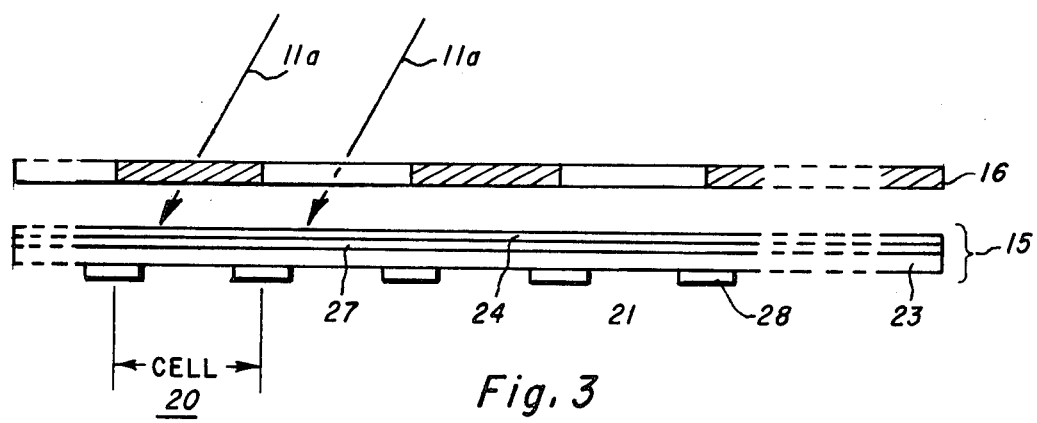
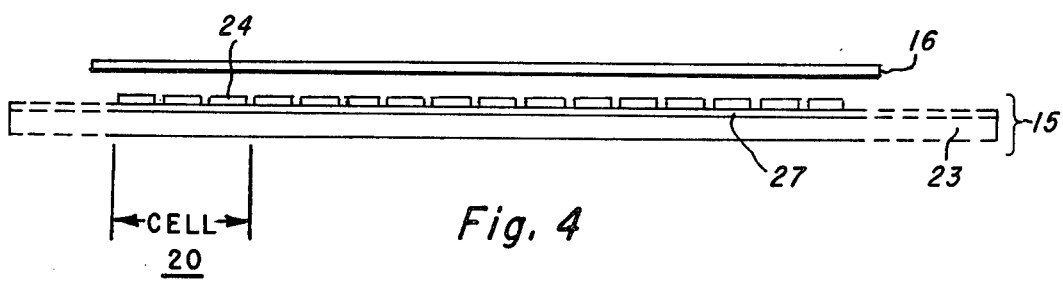

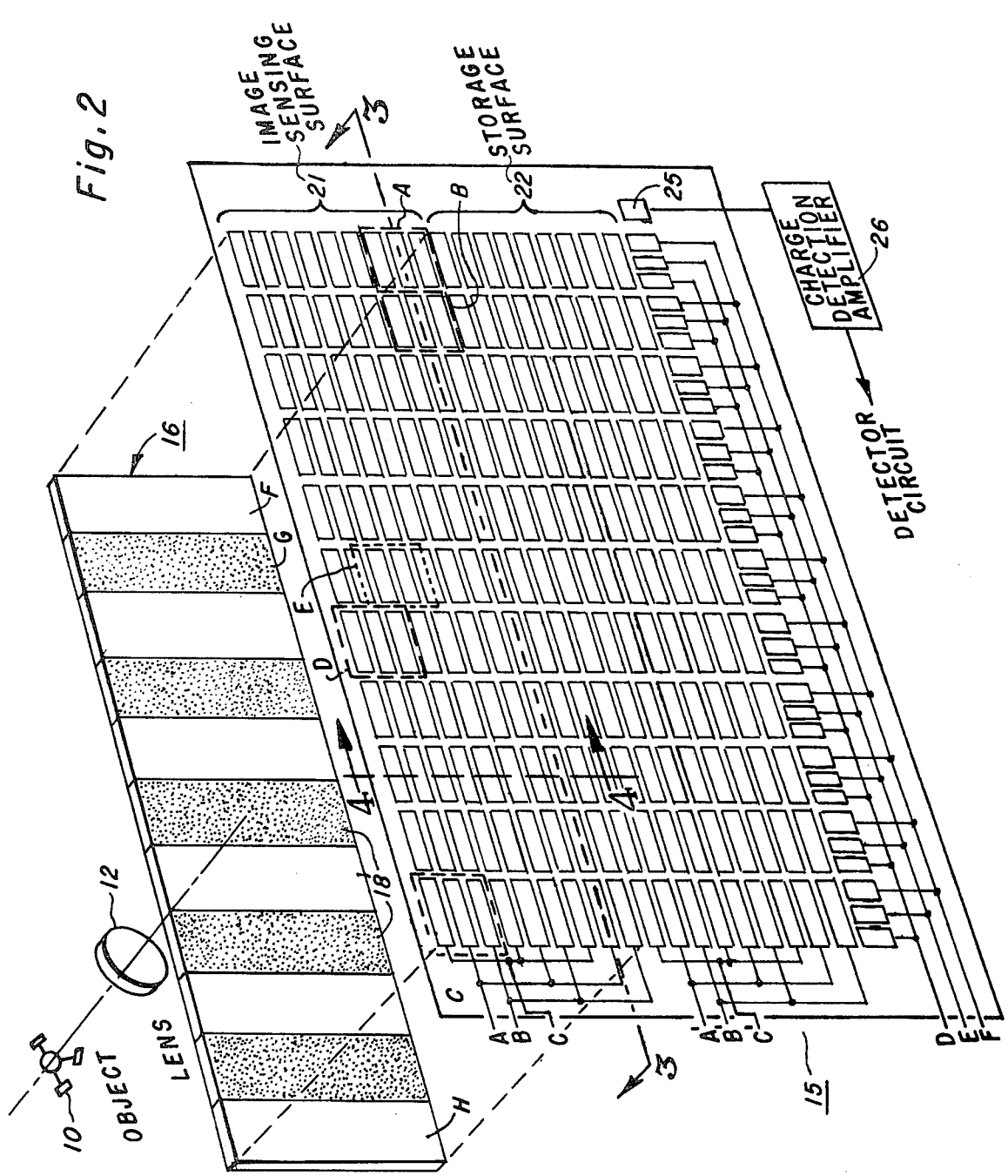

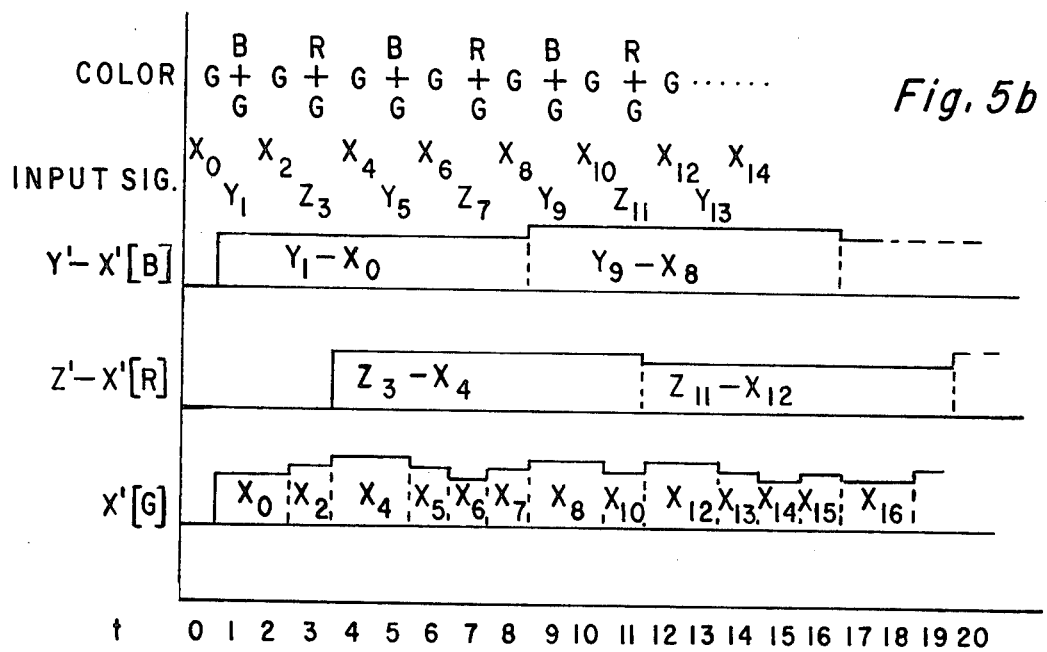
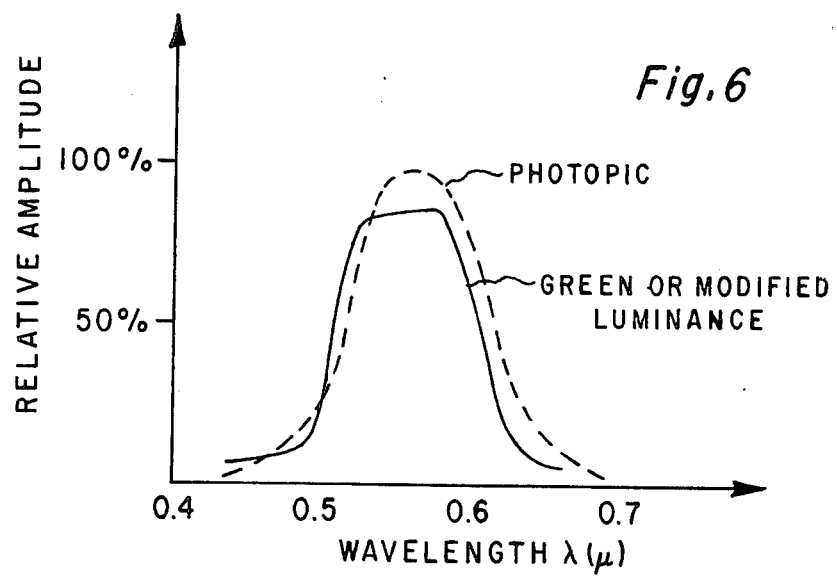

SINGLE SENSOR TIME ENCODED COLOR IMAGING SYSTEM

BACKGROUND OF THE INVENTION

The present invention relates to a color imaging system and more particularly to an improved imaging system preferably using a charge coupled device (CCD) image sensor for producing color information signals in response to light received from an object. The discolored color imaging system may be used as part of a color television camera, particularly, a small hand held color television camera.

Conventional color television camera systems generate the three color signals, e.g., red, green and blue, using three separate vidicon tubes. Splitting the light coming from the object to be televised into three primary colors for transmission to the three vidicons and the magnetic or electrostatic deflection systems associated with each vidicon have resulted in the prior color TV cameras being relatively large and heavy. While this prior art system produces a high quality color signal, the bulk and weight of the camera associated with this system makes it difficult to use, for instance, in hand held applications.

In the prior art, there have been suggestions for color television image pickup systems which utilize, for instance, a striped optical filter and one or two vidicons, or similar devices such as the "plumbicon". Since white and colored light is reproducible using three primary colors, these one or two vidicon systems must be able to discern three primary colors. Typically, a striped optical filter is disposed in front of the vidicon interpreting two or three primary colors. The striped filter causes an alternating pattern of narrow stripes of different color light from the object to fall upon the vidicon's sensitive surface. These stripes are selected sufficiently narrow such that the number of different segments or portions of the output signal from the vidicon, corresponding to striped pattern of light falling on the vidicon's sensitive surface, provide sufficient resolution to yield a clear picture.

The magnetic or electrostatic deflection system used with a vidicon, or similar device, causes its electronic beam to scan or interrogate its light sensitive surface to produce an output signal; however, its electron beam does not move with constant speed across the light sensitive target. While the output signal contains pulses corresponding to the intensity of light falling along the electron beam scan line, there is an inherent uncertainty as to the particular color of light triggering a particular pulse. This uncertainty is caused by a combination of the non-constant speed of interrogation along a scan line and the lack of means for determining which color of light produced a particular output pulse.

This uncertainty makes it difficult for the decoding circuitry to discern which segments of the output signal correspond to a particular primary color. Complex circuits have been utilized to compensate for this uncertainty. For instance, by using a parallel striped filter having a different pitch for each color, color information is then associated with different carrier frequencies (in the output signal) corresponding to the pitch of the stripes, which information can be separated into separate color information signals using electrical bandpass filters. Alternatively, the prior art suggests disposing the stripes at angles and using phase demodulation techniques to separate the color information signals. In either case, the decoding circuitry is complex and because of bandwidth limitations of the vidicon, they are not totally satisfactory. These two vidicon systems used in the prior art incorporate such complex circuitry to compensate aforementioned scanning uncertainties in decoding the color signals generated by the vidicons.

In the prior art it has also been proposed that a charge coupled device (CCD) be used as an image sensor. For instance, U.S. Pat. No. 3,801,884 issued Apr. 2, 1974, disclosed the use of a CCD array in an image pickup system. CCD arrays having 512 by 320 cells for use as an image sensor are currently commercially available from Radio Corporation of America, Lancaster, Pa. under the trade name SID51232. Image sensing CCDs are made up of an array of charged coupled cells which use a clock rather than a scanning electron beam to scan or interrogate the cells. Since highly accurate clocks are known in the prior art, the CCD image sensor does not suffer the non-linearity associated with the magnetic or electrostatic deflection system of a conventional vidicon. That is, a particular output pulse from the CCD image sensor can be associated with a particular physical location on the image sensing surface of the CCD.

There has also been a proposal to use a single CCD image sensor in a color image pickup system, as is described in U.S. Pat. No. 3,982,274, dated Sept. 21, 1976. This system utilizes a complex optical filter whose filter elements are arranged in an array and are sized approximately one-half the size of the CCD elements in the CCD array. This system further provides merely one of two color information signals for each scan line in sequential fashions in addition to a luminance signal for each scan line.

It is, therefore, an object of this invention to improve color television image pickup systems.

It is yet another object of this invention to reduce the complexity of color television pickup systems, for example, by using simplified circuits to decode the signal from a CCD image sensor, to produce three color signals suitable for use in broadcasting a color image of the object.

It is still another object of this invention to use a striped optical filter in conjunction with a CCD image sensor to produce three color signals suitable for use in broadcasting a color image of an object.

It is still yet another object of this invention to simplify striped filters used in single sensor color imaging systems.

It is another object of this invention to produce the color information signal during each scan line producing video information.

It is still another object of this invention to reduce the size of color television camera systems.

It is still yet another object to produce a color television camera system of lower cost than the systems generally in use in the prior art.

The foregoing objects are achieved according to the present invention as is now described. In a preferred embodiment of the invention, a single CCD image sensor is utilized. Light from an object is directed to the image sensor. A striped optical filter is disposed between the light source and the image sensor such that alternating stripes of blue plus green, green, red plus green and green light are imaged on the image sensor's sensitive surface. The output from the image sensor is converted into separate red, green and blue color information signals by examining the pulses or segments of the image sensor signal corresponding to green stripes of light to generate the green signal and by examining the pulses or segments of the image sensor signal corresponding to red plus green and blue plus green stripes of light and substrating the pulses or segments of the signal corresponding to green stripes therefrom to produce the respective red and blue color information signals. Alternate embodiments disclosed use different combinations of primary colors to produce three color information output signals.

BRIEF DESCRIPTION OF THE DRAWINGS

FIG. 1 shows in block diagram form the path of light to the image sensor and the path of electrical signal from the sensor to the output, FIG. 2 is an exploded perspective view of the striped filter disposed over an area image sensor, FIGS. 3 and 4 are cross-sectional views through the striped filter and the image sensor, FIG. 5b depicts the input and output signals derived from the decoder circuit depicted in FIG. 5a, FIG. 6 is a graph on which is plotted curves of green light and luminance detected by the human eye, FIG. 7b depicts the input and output signals derived from the decoder circuit depicted in FIG. 7a.

DETAILED DESCRIPTION

Figure 5A:
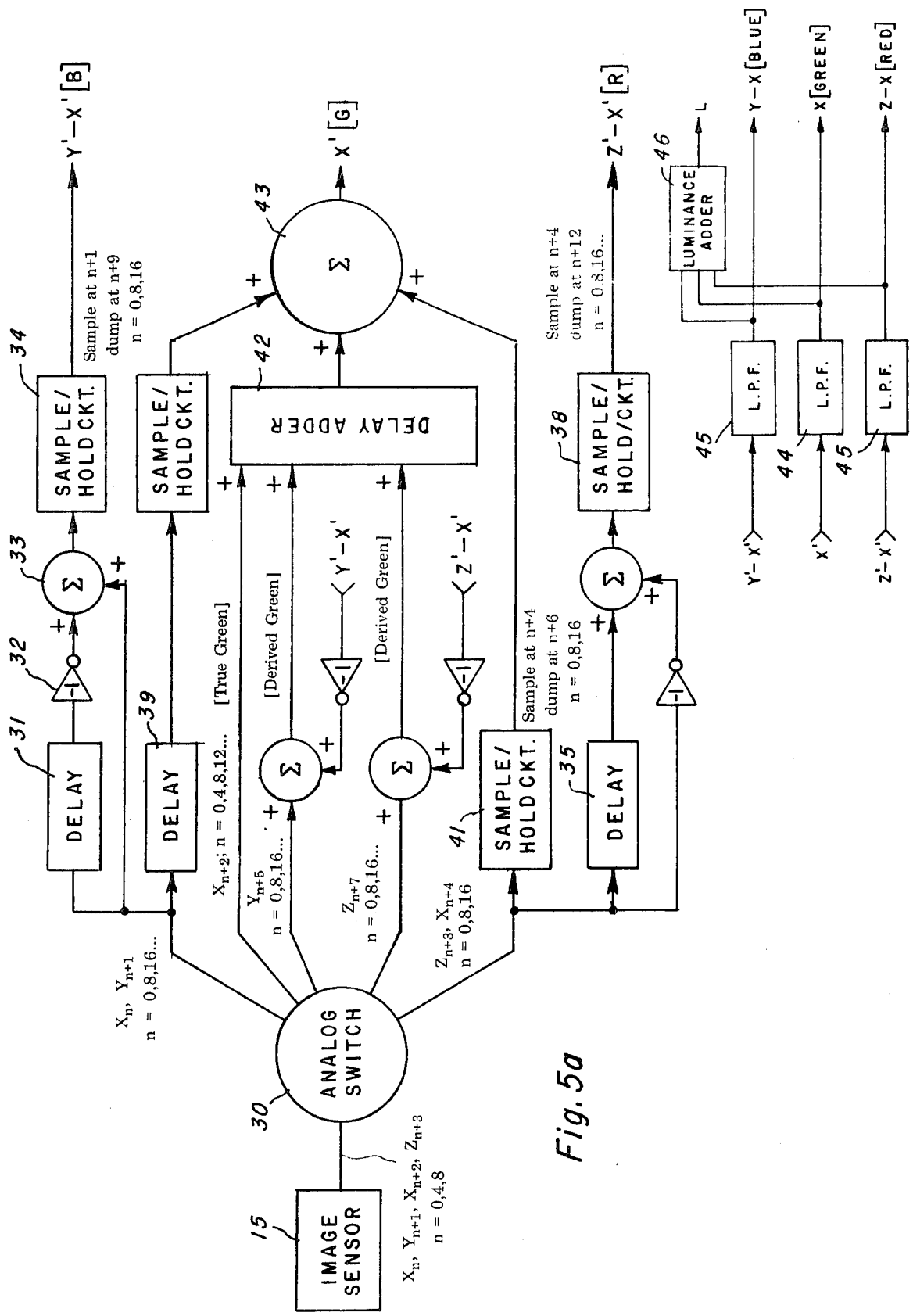
FIG. 5a is a block diagram schematic of a first embodiment of the decoder circuit.

Referring now to FIG. 1 there is shown in diagrammatic form our single sensor time encoded color television image system. A ray of light 11 from an object 10 to be televised is passed through a lens 12 which focuses the ray of light 11 on an image sensor 15, the ray of light 11 passing through a striped filter 16 before striking the sensitive surface of image sensor 15. Striped filter 16 passes different colors of light through its various stripes, preferably passing a stripe of green light, then a stripe of green + blue light, another stripe of green light and next a stripe of green + blue light. The stripes are typically very narrow and thus the aforementioned pattern of stripes repeat many times in a single filter. A striped filter having two filter medias, one media blocking red light, and the other media blocking blue light may be used to construct a preferred striped filter 16 if the one media is applied across the filter, except to that part comprising the green + red stripes and if the other media is also applied across the filter, except to another part comprising the green + blue stripes; the areas where both medias are applied then define a third part which comprises the green stripes, for instance.

Image sensor 15 produces electrical signals representative of the amplitude and position of light impinging the sensitive surface thereof. The signals are applied to a decoder circuit 17 which decodes the signals and produces red, green and blue color signals, as well as a luminance signal. Utilizing any three of the aforementioned signals, the fourth can be generated therefrom. While a decoder circuit need only produce three of such color information signals, the decoder is depicted as producing four color information signals (e.g., the red, green and blue color signals as well as a luminance signal) because of a common usage of such signals in the television broadcasting industry. However, the matrix circuit could produce the L, I & Q signals also known in the television broadcasting industry.

Referring now to FIG. 2, there is shown an exploded perspective view of CCD image sensor 15 with striped filter 16 disposed between image sensor 15 and object 10. It should be understood that striped filter 16 would typically be disposed adjacent to image sensor 15.

Light from object 10 is focused by lens 12 onto the image sensing surface 21 of image sensor 15. Light is inhibited from falling on storage surface 22 of image sensor 15, for instance, by an opaque layer (not shown) or other means. It should be understood, moreover, that storage surface 22 is used to facilitate the production of video signals which are properly timed for use with standard broadcast television systems and that such a storage surface is not required to operate a CCD image sensor nor is it required in the practice of the present invention. If storage section 22 is not used, however, a shutter (not shown) is typically disposed between object 10 and image sensor 15.

Image sensor 15 is shown as being of the three phase frame transfer type, which can be advantageously used to produce an output signal having a 2:1 interlace, such as that used in standard broadcast television. It should be understood, however, that our invention is operable with CCD image sensors of the two or four phase frame transfer type as well as CCD image sensors utilizing other clocking schemes.

The image sensing surface 21 and the storage sensing surface 22 are each shown with 9 rows of electrodes, the electrodes being further grouped into 11 columns. The electrodes in any given row are connected in common to one of the busses A, B C, A', B' or C'. The electrodes are shown as being separated into columns to more clearly depict the light sensitive areas of the semiconductor material underlying the electrodes. The separation between rows is exaggerated for sake of clarity.

Busses A, B, C, A', B' and C' are clocked to transfer the charges stored under the electrodes (in a semiconductive substrate) from image sensing surface 21 to storage surface 22. Busses A', B', C', D, E and F are clocked to transfer the charges stored in storage surface 22 to a charge detector amplifier 26 via a video output terminal 25. Methods of clocking CCD image sensor to obtain a video signal are well known in the art and therefore, we have not explained in detail the operation of the CCD image sensor.

Since this is a three-phase system, three adjacent electrodes, separately connected to the A, B and C busses, comprise one row of sensitive cells 20 (FIGS. 3 and 4). The boundaries between the columns of cells are defined by charge barriers 28 (FIG. 3) disposed in or near the semiconductive substrate. Exemplary of such cells, are those cells 20 indicated by references A, B, C and D. It should be evident that there are thirty-three such cells 20 in the depicted image sensing surface 21 and that it requires many more than that number of cells to produce a high resolution image.

If interlace scanning is utilized, then the electrodes are clocked differently in alternate frames to form cells A, B, C and D during one frame and intermediate cells, such as the cell denoted by reference E, during a next frame. It should be understood that the cells are not physically moving, rather the centers of the light sensitive areas are being electrically displaced. Clocking the image sensor 15 differently in successive frames effects a 2:1 interlace similar to that used in standard television broadcasting.

Each light sensitive cell of image sensor 15 produces a pulse at output terminal 25 when the cells 20 (FIGS.

3 and 4) are read out by properly clocking busses A, B, C, A', B', C', D, E and F. Each pulse is indicative of the amount of light impinging the corresponding cell since the last time a pulse was read out of that cell.

Filter 16 is arranged with stripes 18 being positioned to cause a different color light to impinge each column of cells, unless, of course, the decoding scheme used requires particular adjacent stripes to be of the same color. As a frame is being read out of image sensor 15, the first pulse read out in the first scan line corresponds to the light impinging cell A through stripe F, the second pulse in the first scan line will correspond to the light impinging cell B through stripe G and the last pulse in the last scan line will correspond to the light impinging cell C through stripe H. Thus the output signal from image sensor 15 comprises a series of pulses with adjacent pulses in any given scan line corresponding to particular colors of light passing through filter 16. The pulses are typically processed by a charge detection amplifier 26 before being processed by decoder circuit 17. A charge detection amplifier is a well known apparatus and is used with the CCD image sensor to convert the CCD output charge pulses to a suitable voltage or current signal for further processing.

Since accurate clocks for driving busses A, B, C, A', B', C', D, E and F are known, and since it is known which color of light generated the charge in image sensor 15 (according to the different colors in filter 16), the output pulses from image sensor 15 each correlate with the color or light which produced such pulse to a high degree of certainty; this certainty is not achievable with a conventional vidicon because of the aforementioned non-linearity associated with the magnetic or electrostatic deflection circuits. In the practice of the present invention, it is desirable that the output pulses from the area imaging sensor utilized exhibit a high degree of certainty as to the correspondence of a particular segment or pulse. Thus, it can be seen from the foregoing discussion that a matrix image sensor of the CCD type fulfills this criteria.

FIG. 3 is a sectional top view through image sensor 15. Referring to FIG. 3, filter 16 is shown disposed adjacent to image sensor 15, it being understood that filter 16 could be applied directly to image sensor 15. One of the electrodes 24 associated with a cell 20 is shown disposed over an insulating layer 27 which is in turn disposed over a semiconductive substrate 23 wherein the charge for each cell 20 is stored. Channel stops 28 provide charge isolation barriers between columns of cells 20. While image sensor 15 is shown with preferable front side illumination, the invention is also operable with a back side illuminated CCD image sensor.

FIG. 4 is a sectional side view through image sensor 15 and filter 16. Filter 16 is not depicted with stripes in this view because the section view is being taken through a single stripe. Three electrodes 24 are depicted as being associated with a single cell 20, in agreement with the three phase system depicted in FIG. 2, it being understood that two and four phase and other clocking systems are as well operable in the practice of our invention.

Figure 7A:
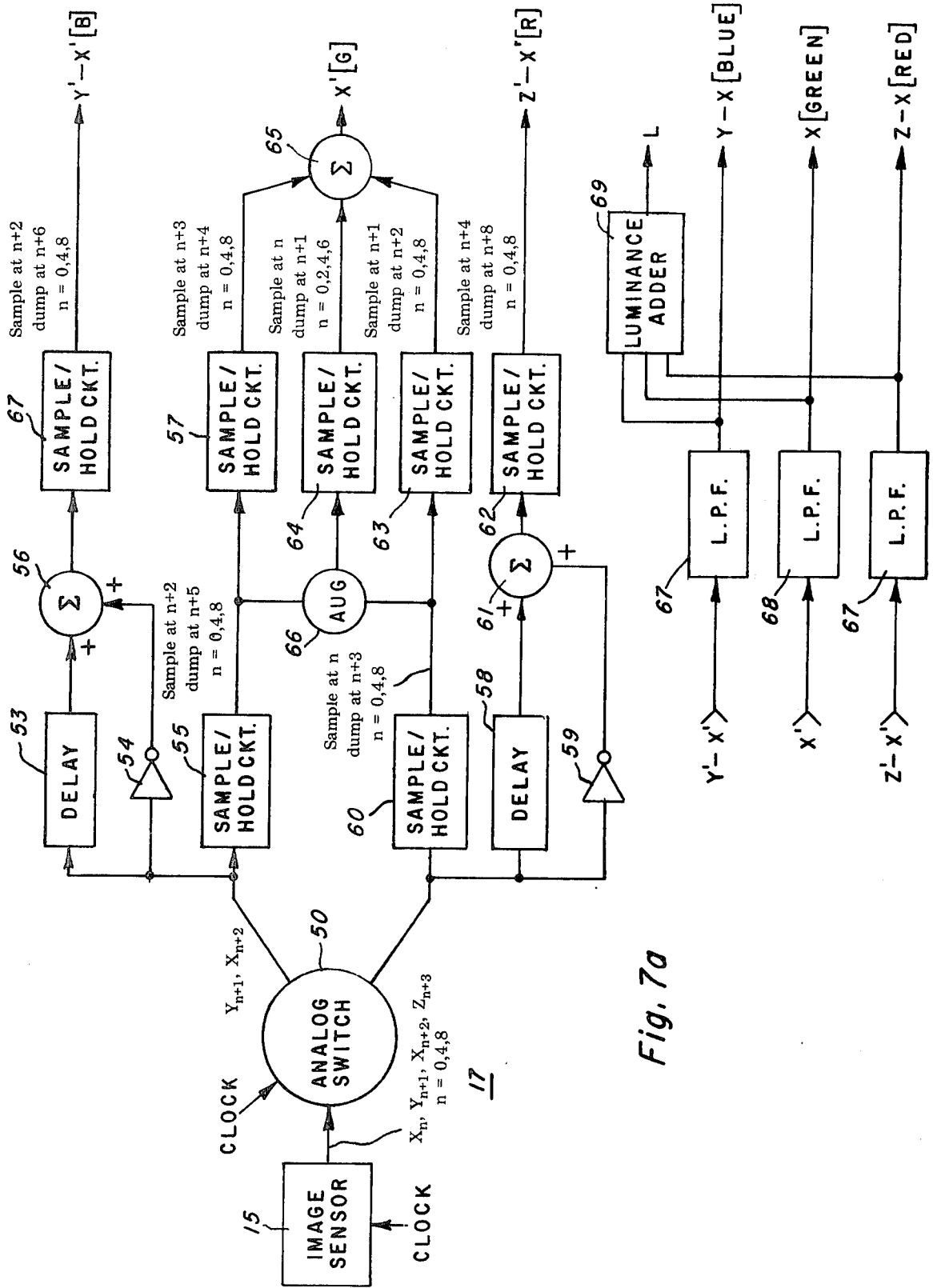
FIG. 7a is a block diagram of a second embodiment of the decoder circuit.

Referring again to FIG. 2, if striped filter 16 is selected to pass green light through stripe H, green + blue through stripe J, green light through stripe K and green + red through stripe L, then either the first or second embodiment of decoder circuit 17 depicted in FIGS. 5a and 7a may be utilized to detect the green, red and blue color information signals representative of the light from object 10 impinging image sensor 15. The aforementioned filter 16 alternately passing stripes of green, green + blue, green and green + red light is more easily manufactured than a filter which alternately passes stripes of red, green and blue light, for instance, because the aforementioned filter may be produced using only two different filter medias. For example, the aforementioned filter may be manufactured with a first filter media opaque to red light applied in all stripes except those passing green + red light, and a second filter media opaque to blue light applied in all stripes except those passing green + blue light. It should be evident that such a filter is more easily manufactured than a filter having alternate stripes of filter material opaque to red, green and blue light, for instance. As will be seen, the decoder circuits 17 of FIGS. 5a and 7a may also be employed with striped filters having other filtering schemes, so long as some of the stripes pass one primary color and other stripes pass that one primary color in addition to other primary colors.

The stripes of filter 16 are properly registered with the columns of cells 20, thus the output signal from image sensor 15 comprises a series of pulses corresponding to the amplitude and position of light impinging upon its sensitive surface, with some of the pulses corresponding to the green light impinging its sensitive surface and with other pulses corresponding to either the green + red or green + blue light impinging its sensitive surface, these pulses being interleaved according to the pattern of stripes formed by striped filter 16.

FIRST EMBODIMENT OF THE DECODER CIRCUIT

Referring now to FIG. 5a, there is shown in block diagram form a schematic of a first embodiment of decoder circuit 17 according to the present invention. As aforementioned, the output from image sensor 15 is a signal comprised of interleaved pulses or segments of color information. In FIG. 5a, the output from image sensor 15 is shown as a train of pulses: $X_n$, $X_{n+1}$, $X_{n+2}$, $Z_{n+3}$ . . . the capital letters referring to the signal amplitude for a particular color or a combination of colors while the subscripts indicate the time segment ($t$), since the beginning of the scan line, at which a particular pulse is generated by the image sensor 15. The letters X, Y and Z are used in FIG. 5 to denote the signals representing the colors or combination of colors generated by image sensor 15, to demonstrate the general applicability of this first embodiment of decoder circuit 17. However, for reasons which will become clear, X preferably corresponds to the pulses generated by green light, Y preferably corresponds to the pulses generated by the green + blue light and Z preferably corresponds to the pulses generated by the green + red light.

The output from image sensor 15 is applied to an analog switch 30 which operates in timed relation to the clock interrogating image sensor 15. Techniques from operating analog switch 30 in timed relation to a clock signal, such as the clock signal here indicative of which color of light produced by the segment of output signal from image sensor 15 then received by analog switch 30, are well known in the art. Analog switch 30 has five outputs, the first output corresponding to the $X_n$ and $Y_{n+1}$ pulses, a second output corresponding to the $X_{n+2}$ and $X_{n+6}$ pulses, a third output corresponding to the $Y_{n+5}$ pulses, a fourth output corresponding to the $Z_{n+7}$ pulses and a fifth output corresponding to the $Z_{n+3}$ and $X_{n+4}$ pulses. Each of the pulses at the five outputs from analog switch 30 repeat every eight time segments, that is "n" may equal 0, 8, 16 . . . The first output from analog switch 30 is supplied to a one-time segment delay circuit 31 and then to an adder 33 via inverter 32. Adder 33 is also responsive directly to the first output from analog switch 30. The output from adder 33 is applied to sample and hold circuit 34 with samples at times $n+1$ for $n=0, 8, 16, \ldots$ and dumps 8 time segments later. Thus the output from sample and hold circuit 34 comprises the quantity $Y_{n+1} - X_n$ appearing at $t = n+1$ for eight time segments and labelled as Y'-X'. A primed capital letter is used to refer to an output signal before processing by a low pass filter.

Similarly, the fifth output from analog switch 30 is applied separately via delay circuit 35 and inverter 36 to adder 37 and thereon to sample and hold circuit 38 which samples at $t = n+4$ and dumps 8 time segments later to produce a Z'-X' output. The X' output is partially generated from the $X_n$ pulse occurring at the first output from analog switch 30, the $X_n$ pulse being delayed one time segment by delay circuit 39 and sampled at time $n+1$ and dumped at time $n+3$ by sample and hold circuit 40. The $X_{n+4}$ pulse from the fifth output from analog switch 30 is supplied via sample and hold circuit 41 to provide another part of the X output. The $X_{n+2}$ and $X_{n+6}$ pulses from the second output of analog switch 30 are supplied to an adder/delay circuit 42; derived X pulses are produced by taking the $Y_{n+5}$ and $Z_{n+7}$ pulses (from the third and fourth outputs of analog switch 30) and substracting therefrom the Y'-X' and Z'-X' output signals, respectively, and supplying these derived X pulses likewise to adder/delay circuit 42. Adder/delay circuit 42 adds the pulses supplied thereto and delays each one time segment. Adding the output from adder/delay circuit 42 to the outputs from sample and hold circuits 40 and 41 at adder 43 generates the X' signal.

The output signals and input signals are diagrammatically depicted in FIG. 5b. As aforementioned, striped filter 16 for the decoder depicted in FIG. 5a preferably passes green, green + blue, green, green + red light in a repeating pattern of light from the object. Thus, the X' signals preferably correspond to the green light, the Y' pulses preferably correspond to the green + blue light and the Z' pulses preferably correspond to the green + red light, as is shown in FIG. 5b. Therefore, the Y'-X' output corresponds to the blue color information signal, the Z'-X' output corresponds to the red color information signal and the X' output corresponds to the green color information signal. Brackets are used in FIG. 5a to depict this preferred signal to color relationship.

The X' output is passed through a low pass filter 44 which has bandwidth of approximately 3 MHz. Similarly, the Z'-X' and Y'-X' signals are passed through low pass filters 45 each of which has a bandwidth approximately 0.50 MHz. The outputs from the three low pass filters 44 and 45 (X, Z-X and Y-X) provide the three color information signals; the three outputs may be applied to the input of a luminance adder matrix 46 to generate a luminance signal (L).

As can be seen from FIG. 5b, the frequency of the X channel (preferably the green channel) is significantly higher than the frequencies of either the Z-X (preferably red) channel or the Y-X (preferably blue) channel. It can also be seen that the low frequency portions of the luminance signal, i.e., those below 0.50 MHz comprise portions of X, Z-X and Y-X signals whereas the higher frequency portions of the luminance signal, i.e., those between approximately 0.50 MHz and 3 MHz, are made up of primarily the X signal; this dependence on primarily the X signal for the higher frequency portions of luminance signal provides a pleasing picture to the human eye, especially if the X signal is selected to represent the green or modified photopic response portions of the color signal as shown in FIG. 6 for reasons which are discussed below. The bandwidth of the Z-Y and Y filters 36 is limited to 0.50 MHz, to reduce the propensity of the system to generate more interference patterns in accordance with information processing theory. Using a 0.50 MHz filter does not appreciably reduce picture quality to the human eye.

As the physical size of a source of light decreases, that is, as the subtended angle of incidence in the human eye of the light source decreases, the human eye loses its ability to discern color information before it loses its ability to discern the presence of the object. Effectively, the response of the human eye to color information has a narrower bandpass than its response to luminance information. Therefore, in color television systems, the color signals need not have the same bandwidth as the luminance signal simply because there is no purpose in displaying information which the human eye cannot discern.

Referring now to FIG. 6, there is graphically shown the curve of wavelength versus relative amplitude of green light and total light detected by the eye. The green light is represented by a solid line while eye sensitivity is represented by a dashed line. As red light has a longer wavelength and blue light has a shorter wavelength than green light, it can be seen that the relative sensitivity of the human eye to these primary colors is (1) green, (2) red and lastly (3) blue. Further, the aforementioned insensitivity of the human eye to the color of light having small angles of incidence effects red and blue light before it affects green light. Given this greater sensitivity to green light, the color information signal produced by decoder 17 in accordance with the invention, capable of representing the smallest size object, is the green color information signal. Since the X signal has the greatest bandwidth and thus can convey the most video information, the X signal preferably corresponds to the green color or modified photopic component of the video information.

Thus, in the practice of our invention, it is preferred that the high frequency X signal represent the green color information while the red and blue color information be represented by the lower frequency Y-X and Z-X signals. Therefore, in FIG. 5a, brackets are used to show that X may be replaced by G to represent green, Z-X may be replaced by R to represent red, and Y-X may be replaced by B to represent blue; further Y may be replaced by green/blue and consequently Z can be replaced by green/red.

SECOND EMBODIMENT OF THE DECODER CIRCUIT

Referring now to FIG. 7a, there is shown in block diagram form a schematic of a second embodiment of decoder circuit 17 according to the present invention. As in the first embodiment of decoder circuit 17, the output from image sensor 15 is a signal comprising interleaved pulses or segments of color information. In FIG. 7a, the output from image sensor 15 is shown as $X_n$, $Y_{n+1}$, $X_{n+2}$, $Z_{n+3}$, . . . the capital letters referring to the signal amplitude for a particular color or combination of colors while the subscripts indicate the time segment (t) since the beginning of the scan line at which a particular signal is generated by image sensor 15. The letters X, Y and Z are used in FIG. 7a to denote the signals representing the colors or combination of colors generated by CCD image sensor 15, to demonstrate the general applicability of the second embodiment of decoder circuit 17. The relationship of the colors X, Y and Z to the colors utilized in the second embodiment, e.g., red, green and blue, are preferably the same as in the first embodiment for the reasons aforementioned.

As in the first embodiment, the output from image sensor 15 comprises interleaved segments or pulses corresponding to one primary color represented by the X pulses and two different combinations of primary colors represented by the Y and Z pulses, such that the quantities Y–X and Z–X represent the other two primary colors.

The output from image sensor 15 is applied to an analog switch 50. Analog 50 has two outputs, a first output on line 51 being the $Y_{n+1}$ and $X_{n+2}$ pulses for $n = 0, 4, 8, 12$ and a second output on line 52 being $X_n$ and $Z_{n+3}$ pulses for $n = 0, 4, 8, 12$ ... The output from analog switch 50 on line 51 is applied to the inputs of a one-time-segment delay circuit 53 and an inverter 54 and a sample and hold circuit 55. The outputs from delay circuit 53 and inverter 54 are applied to the inputs of an adder circuit 56, whose output is applied to a sample and hold circuit 67 which samples at $n+2$ and holds for four time segments, thus producing a Y–X output. Sample and hold circuit 55 samples at $n+2$ and dumps at $n+5$ thereby sampling the X pulse and holding it for three time segments. The output from sample and hold circuit 55 is applied to input of an averaging circuit 66 and sample and hold circuit 57. Sample and hold circuit 57 samples at time $n+3$ and dumps at $n+4$ there providing the $n+2$ pulses at times $n+3$ for $n+0, 4, 8, \ldots$ The output from analog switch 50 on line 52 is similarly applied to the inputs of a one-time-segment delay circuit 58, an inverter 59 and a sample and hold circuit 60. The outputs from delay circuit 58 and inverter 59 are applied to an adder circuit 61 which is, in turn, outputted to a sample and hold circuit 62. Sample and hold circuit 62 samples at time $n+4$ and holds for four time segments, thereby producing a Z'–X' output signal. Sample and hold circuit 60 samples at time $n$ and dumps it at time $n+3$. The output from sample and hold circuit 60 is applied to averaging circuit 66 and to sample and hold circuit 63. Averaging circuit 66 provides an output to sample and hold circuit 64 which is an arithmetic average of the amplitude of the pulses then received at its inputs. Sample and hold circuit 64 samples at time $n$ and dumps at time $n+1$ and samples again at time $n+2$ and dumps at time $n+3$. Thus, sample and hold circuit 64 produces an arithmetic average X pulse corresponding to the time segments $(n+1, n+3)$ for which a true X pulse is unavailable. Sample and hold circuit 63 samples at time $n+1$ and dumps it at time $n+2$.

The outputs from sample and hold circuits 57, 63 and 64 are applied to an adder circuit 65 which whose output is the X' color information signal.

Figure 7B:
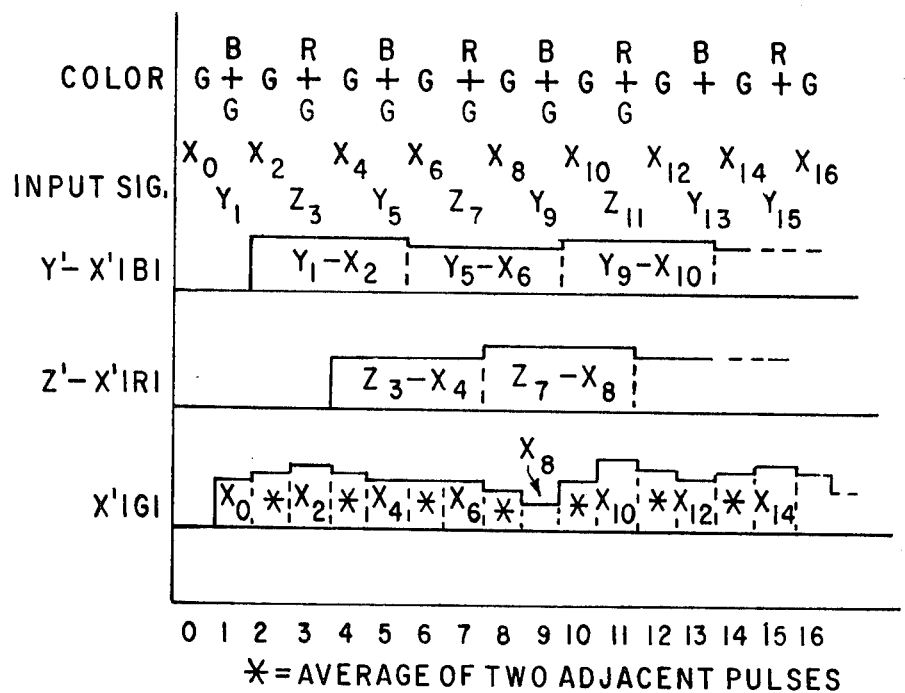

FIG. 7b depicts, in representative form, the input signal received by decoder 17 from image sensor 15 and the output signals produced thereby according to the embodiment shown in FIG. 7a. Referring now to FIGS. 7a and 7b, the Y'–X' output, at $t=2$ for instance, comprises the $Y_1-X_2$ output produced by adders 56. When sample and hold circuit 67 samples the output of adder 56 four time segments later, it then samples the $Y_5-X_6$ signal being outputted. Similarly, the Z'–X' output is first sampled at $t=4$ and held for four time segments, thereby sampling the $Z_3-X_4$ signal being outputted from adder circuit 61; four time segments later the $Z_7-X_8$ signal outputted from adder circuit is sampled. The X output at $t=1$ comprises the $X_0$ pulse processed by sample and hold circuits 60 and 63. The next pulse (appearing at $t=2$) is an average of the $X_0$ and $X_2$ pulses processed by averaging circuit 66 and sample and hold circuits 55, 60 and 64. The following pulse (appearing at $t=3$) is the $X_2$ pulse processed by sample and hold circuits 55 and 57. The pulse appearing next (at $t=4$) is the average of the $X_2$ and $X_2$ and $X_4$ pulses which is processed by averaging circuit 66 in combination with sample and hold circuits 55, 60 and 64. As can be seen, the process then repeats with the $X_4$ pulse being outputted at $t=5$, the cycle repeating itself.

Since the X channel is a higher frequency channel than either the Y–X or Z–X channels, for the reasons aforementioned, the X channel preferably corresponds to the green color or modified photopic response information signal and the Y–X and Z–X channels preferably correspond to the blue and red color information signals. The Y'–X',X' and Z'–X' channels are preferably processed by low pass filters 67 and 68 and luminance matrix 69 to generate an luminance (L) signal along with color information signals which have been processed by low pass filters 67 and 68 to smooth out the step changes which would otherwise occur between the different outputs from the sample and hold circuits. These step changes are depicted in FIG. 7b. Low pass filter 68 preferably has a bandpass of 3 MHz while low-pass filters 67 preferably have a bandpass of 0.75 MHz.

The decoder depicted in FIG. 7a generates the Y–X and Z–X signals once very four time segments in lieu of the once every eight time segments according to the embodiment depicted in FIG. 5a, thereby producing greater resolution in the Y–X (preferably blue) and Z–X (preferably red) channels. Additionally, the embodiment depicted in FIG. 7a does not assume that the Y'λ –X' or Z'–X' signals remain constant over a plurality of time segments in order to produce a derived X (preferably derived green) signal such as is done with the $Y_{n+5}$ and $Z_{n+7}$ pulses according to the embodiment shown in FIG. 5a. Thus the embodiment shown in FIG. 7a avoids any inaccuracies associated with that assumption.

Having described a first embodiment and a second embodiment in detail, it is to be understood that further modifications may suggest themselves to those skilled in the art; for instance, by modifying the striped filter 16 to produce an output signal from image sensor 15 comprising pulses corresponding to the following colors and combinations thereof: green, green + blue, green, green + red, green, green, green, green. The pulses occurring at times $n+5$ and $n+7$ are pure greens and need not have the Y'–X' and Z'–X' signals subtracted therefrom in order to derive green pulses as is done by the decoder depicted in FIG. 5a. Additionally, while we prefer to practice the invention using red, green and blue primary colors, it should be evident that other primary colors may also be used, for instance, cyan, magenta and yellow primary colors. Further, in lieu of using low pass filters 35 and 36 or 67 and 68, or in combination therewith, optical resolution reducing filters may be disposed between the object and image sensor 15. Also, because it is difficult to fabricate a single filter having exactly the transmistivity desired, trimming filters may be used therewith to more closely attain the desired transmistivity. Still further, the X channel may be made to represent luminance information by using clear stripes 18 in filter 16 for those columns of cells 20 which would produce pulses for the X channel. Then the Y-X and Z-Y outputs would have to be inverted to generate red and blue (respectively, if Y corresponds to green/blue and Z corresponds to green/red) color information signals. A green color information signal can be easily generated from the luminance, red and blue color information signals produced. And still further, using the data sampling techniques herein disclosed in combination with a matrix image sensor, it should be evident that stripes alternatively passing red, green and blue color light may be used to generate the red, green and blue color information signals. It is to be understood that the invention is not limited to the specific embodiments disclosed except as set forth in the appended claims.

What is claimed is:

1. A method of producing three color information signals representative of the shape and color of light received from an object, said method comprising:
   a. selectively filtering a first primary color from all but a first part of said light and selectively filtering a second primary color from all but a second part of said light, said first and second primary colors being filtered from a third part of said light, whereby said third part includes light of a third primary color;
   b. encoding the selectively filtered light into an electrical signal using a matrix image sensor, said electrical signal being representative of the light of said first, second and third primary colors received by said image sensors; and
   c. decoding said electrical signal produce a first color information signal representative of the light of said first primary color, a second color information signal representative of the light of said second primary color and a third color information signal representative of the light of said third primary color.

2. The method according to claim 1, wherein the step of decoding said electrical signal comprises:
   a. sampling segments of said electrical signal produced by the light of said third part to produce said third color information signal;
   b. sampling segments of said electrical signal produced by the light of said first part and subtracting therefrom sampled segments of said electrical signal produced by the light of said third part, producing thereby said first color information signal; and
   c. sampling segments of said electrical signal produced by the light of said second part and subtracting therefrom samples segments of said electrical signal produced by the light of said third part, producing thereby said second color information signal.

3. The method according to claim 2, wherein the step of selectively filtering said light is accomplished using a striped filter, said striped filter filtering said light into said first, second and third parts and wherein said matrix image sensor is a charge coupled device image sensor.

4. The method according to claim 3, wherein said striped filter selectively passes green/blue color light for said first part, passes green/red color light for said second part and passes green light essentially alone for said third part.

5. The method according to claim 4, wherein said striped filter has a plurality of stripes passing said green/blue color light, another plurality of stripes passing said green/red color light and still another plurality of stripes passing essentially green color light alone.

6. The method according to claim 1, wherein said electrical signal comprises a series of pulses, said electrical signals including pulses representative of the light of said first, second and third parts and wherein said matrix image sensor is a charge coupled device image sensor.

7. The method according to claim 6, wherein said first, second and third color information signal each comprise a series of pulses, the pulses of said first color information signal occurring at a higher frequency than the occurrence of pulses of either of said second and third color information signals.

8. The method according to claim 6, wherein the step of selectively filtering said light is accomplished using a striped filter, said striped filter filtering said light into said first, second and third parts and wherein said pulses representive of light of said first, second and third parts are interleaved according to the pattern of stripes in said striped filter.

9. The method according to claim 8, wherein the step of decoding said electrical signals comprises the steps of:
   a. subtracting the pulses representative of light of said third part from pulses representative of light of said first part, thereby obtaining pulses representative of the light of said first primary color essentially alone;
   b. subtracting the pulses representative of light of said third part from pulses representative of light of said second part, thereby obtaining pulses representative of the light of said second primary color essentially alone; and
   c. preserving pulses representative of the light of said third part, thereby obtaining pulses representative of the light of said third primary color essentially alone.

10. The method according to claim 9, wherein the step of decoding said electrical signal further includes the steps of sampling and holding said pulses representative of the light of said third part and averaging adjacent pulses of the light of said third part to produce average pulses representative of the light of said third part.

11. The method according to claim 10, wherein the step of decoding said electrical signal further includes the step of interleaving said average pulses and said pulses representative of the light of said third part.

12. The method according to claim 9, wherein the stripes of said striped filter passing said light into said first and second parts are essentially constant width stripes.

13. An electrical imaging system in which light, including three primary colors, is received from an object, said system comprising:
   a. a striped filter having a plurality of first stripes for filtering a first primary color from said light, a plurality of second stripes for filtering a second primary color from said light, and a plurality of third stripes for filtering said first and second primary colors from said light;

b. a matrix image sensor responsive to light received from said object and passed through said striped filter for producing an output signal in response thereto; and c. a decoder circuit responsive to said output signal for producing a first color information signal representative of the light of said first primary color, a second color information signal representative of the light of said second primary color and a third color information signal representative of the light of a third primary color in response to the output received from said image sensor.

14. The system of claim 13, wherein said decoder circuit comprises:

a. first circuit means responsive to segments of said output signal produced by the light of said third part for producing said third color information signal;

b. second circuit means responsive to segments of said output signal produced by the light of said first part and segments of said output signal produced by the light of said third part for producing said first color information signal; and c. third circuit means responsive to segments of said output signal produced by the light of said second part and segments of said output signal produced by the light of said third part for producing said second color information signal.

15. The system according to claim 14, wherein said matrix image sensor is a charge coupled device; wherein said second circuit means comprises an analog switch responsive to said output signals and having two outputs, a first output providing segments of said output signal produced by the light of said first part and selected segments of said output signal produced by the light of said third part and said second output providing segments of said output signal produced by the light of said second part and selected segments of said output signal produced by the light of said third part, and means for subtracting said selected segments of said output signal produced by the light of said third part from segments of said output signal produced by the light of said first part; wherein said third circuit means comprises said analog switch and means for subtracting selected segments of said output signal corresponding to the light of said third part from segments of said output signal corresponding to the light of said second part; and wherein said first circuit means comprises said analog switch and means for sampling said selected segments of said output signal corresponding to the light of said third part from said first and second outputs of said analog switch.

16. The system according to claim 15, wherein said first circuit means further comprises means for generating averaged signal segments in response to selected ones of said segments of said output signal correspond to the light of said third part and means for interleaving said averaged signal segments among said segments of said output signal corresponding to the light of said third part.

17. The electrical imaging system of claim 13 disposed in a color television camera.

18. A method of producing three-color information signals representative of the light received from an object, said method comprising:

a. selectively filtering a first primary color from all but a first part of said light and selectively filtering a second primary color from all but a second part of said light, whereby the selectively-filtered light further includes a third part corresponding to at least a third primary color;

b. encoding the selectively-filtered light into an electrical signal using a matrix image sensor, said electrical signal being representative of light of said first, second and third primary colors received by said image sensor;

c. sampling segments of said electrical signal produced by the light of said third part to produce a third color information signal at least representative of said third primary color;

d. sampling segments of said electrical signal produced by the light of said first part and comparing therewith sampled segments of said electrical signal produced by the light of said third part to produce a first color information signal being the arithmetic difference of the amplitude of segments of said electrical signal produced by the light of said first part and of the amplitude of segments of said electrical signal produced by the light of said third part;

e. sampling segments of said electrical signal produced by the light of said second part and comparing therewith sampled segments of said electrical produced by the light of said third part to produce a second color information signal being the arithmetic difference of the amplitude of segments of said electrical signal produced by the light of said second part and of the amplitude of segments of said electrical signal produced by the light of said third part.

19. The method according to claim 18, wherein the step of selectively filtering said light is accomplished by using a striped filter, said striped filter filtering said light into said first, second and third parts and wherein said matrix image sensor is a charge coupled device image sensor.

20. The method according to claim 19, wherein said striped filter selectively passes green + blue color light for said first part, passes green + red color light for said second part and passes green light essentially alone for said third part.

21. The method according to claim 19, wherein said striped filter selectively passes green + blue color light for said first part, passes green + red color light for said second part and passes essentially every color light for said third part.

22. A color charge transfer imager system comprising:

a. a charge transfer imaging array having a plurality of rows and columns of charge transfer elements forming an image receiving surface;

b. a color filter adjacent to the image receiving surface of said array, said filtering having a plurality of regions, first ones of said regions passing red plus green light, second ones of said regions passing blue plus green light and third ones of said regions passing green light;

c. means for translating each row of charge signals shifted out from said array into an electrical signal representative of the amplitude and color of light impinging said image receiver surface through said filter; and d. decoder circuit means responsive to said electrical signal for producing a plurality of color information signals.

23. The system of claim 22, wherein said decoder circuit means comprises;
   a. first circuit means responsive to portions of said electrical signal produced by light passing through at least one of said third ones of said regions for producing one of said color information signals;
   b. second circuit means responsive to portions of said electrical signal produced by light passing through at least one of said second ones of said regions and portions of said electrical signal produced by light passing through at least one of said third ones of said regions for producing another one of said color information signals; and
   c. third circuit means responsive to portions of said electrical signal produced by light passing through at least one of said first ones of said regions and portions of said electrical signal produced by light passing through at least one of said third ones of said regions for producing still another one of said color information signals.

24. The system of claim 23, wherein second and third circuit means subtract the magnitudes of the respective portions of said electrical signal to which they are responsive.

25. The system of claim 23, wherein said plurality of regions define a plurality of stripes on said filter, said stripes being aligned with said columns of charge transfer elements.

26. The system of claim 25, wherein the total number of stripes passing green light alone is substantially greater than the total number of stripes passing either red plus green light or blue plus green light.

27. A color charge transfer imager device comprising, in combination:
   a. a charge transfer imaging array having an image receiving surface; and
   b. a color filter disposed adjacent to the image receiving surface of said array, said filter having a plurality of regions, first ones of said regions passing two primary colors of light, second ones of said regions passing another two primary colors of light and third ones of said regions only one primary color of light.

28. The device according to claim 27, wherein said first ones of said regions pass red plus green light, wherein said second ones of said regions pass blue plus green light and said third ones of said regions pass green light alone.

29. The device according to claim 28, wherein the total number of regions pass green light alone is substantially greater than the total number of regions passing either red plus green light or blue plus green light.

30. The device according to claim 29, wherein said array has a plurality of rows and columns of charge transfer elements, wherein said plurality of regions define a plurality of stripes and wherein said stripes are aligned with the columns of charge transfer elements.

31. The device according to claim 28, wherein said array has a plurality of rows and columns of charge transfer elements, wherein said plurality of regions define a plurality of stripes and wherein said stripes are aligned with the columns of charge transfer elements.

* * * * *